United States Patent [19]

Rochester et al.

[11] Patent Number: 5,179,612
[45] Date of Patent: Jan. 12, 1993

[54] OPTICAL FIBER CANISTER WITH ABLATIVE COATING

[75] Inventors: James R. Rochester; Richard B. Barnes, both of Tucson, Ariz.

[73] Assignee: Hughes Aircraft Company, Los Angeles, Calif.

[21] Appl. No.: 810,656

[22] Filed: Dec. 19, 1991

[51] Int. Cl.$^5$ ............................................... G02B 6/16
[52] U.S. Cl. ................................. 385/123; 244/3.12; 244/3.16; 385/134
[58] Field of Search ............... 385/122, 123, 124, 125, 385/126, 127, 128, 134; 244/3.12, 3.16

[56] References Cited

U.S. PATENT DOCUMENTS

| | | | |
|---|---|---|---|
| 4,995,698 | 2/1991 | Myers | 385/134 X |
| 5,005,930 | 4/1991 | Schotter | 385/134 |
| 5,029,960 | 7/1991 | Hulderman et al. | 385/123 X |
| 5,042,907 | 8/1991 | Bell et al. | 385/123 |

*Primary Examiner*—John D. Lee
*Assistant Examiner*—Phan T. Heartney
*Attorney, Agent, or Firm*—R. M. Heald; C. D. Brown; W. K. Denson-Low

[57] ABSTRACT

An optical fiber payout canister (36) comprises a bobbin (42) upon which an optical fiber (34) is wound. A shroud (50) overlies the bobbin (42), and a layer (54) of an ablative material is coated onto at least a portion of the inside wall (48) of the shroud (50) adjacent to the bobbin (42), so that the optical fiber (34) may contact the ablative material (54) during payout. Desirably, the ablative material (54) has a hardness equal to or less than that of the buffer layer of the optical fiber (34). In one embodiment, the ablative material (54) has a composition similar to that of the polymer buffer layer, such as an urethane acrylate. The ablative material (54) removes energy from the optical fiber during payout, and in particular reduces the circumferential component of the energy, permitting the optical fiber (34) to be dispensed through a dispensing opening (58) in an end wall (60) of the shroud (50).

18 Claims, 1 Drawing Sheet

OPTICAL FIBER CANISTER WITH ABLATIVE COATING

BACKGROUND OF THE INVENTION

This invention relates to optical fiber canisters, and, more particularly, to the construction of such a canister designed to damp the rotational motion of the optical fiber as it is payed out.

Optical fibers are strands of glass fiber processed so that light transmitted therethrough is subject to total internal reflection. A large fraction of the incident intensity of light directed into the optical fiber is received at the other end of the optical fiber, even through the optical fiber may be hundreds or thousands of meters long. Optical fibers have shown great promise in communications applications, because a high density of information may be carried bidirectionally along the optical fiber and because the quality of the signal is less subject to external interferences of various types than are electrical signals carried on metallic wires. Moreover, the glass fibers are light in weight and made from a highly plentiful substance, silicon dioxide.

Glass optical fibers are typically fabricated by preparing a preform of glasses of two different optical indices of refraction, one inside the other, and processing the preform to a fiber. The optical fiber is coated with a polymer layer of a material such as a urethane acrylic, termed a buffer layer, to protect the glass from scratching or other damage. As an example of the dimensions, in a typical configuration the diameter of the glass optical fiber is about 125 micrometers, and the diameter of the optical fiber plus the polymer buffer is about 250 micrometers (approximately 0.010 inches).

For such very fine optical fibers, the handling of the optical fiber to avoid damage that might reduce its mechanical strength and/or light transmission properties becomes an important consideration. In one approach, the optical fibers are wound onto a cylindrical or tapered cylindrical bobbin (collectively termed herein a "tapered" cylindrical bobbin even though the angle of the taper may be zero) with many turns adjacent to each other in a side-by-side fashion. After one layer is complete, another layer of optical fiber is wound on top of the first layer, and so on. A weak adhesive is typically applied to the layers of optical fiber, to hold them in place. The final assembly of the bobbin and the wound layers of optical fiber is termed a canister, and the mass of wound optical fiber is termed the fiber pack. When the optical fiber is later to be used, the fiber is payed out from the canister in a direction generally parallel to the axis of the cylinder.

As the optical fiber is payed out from the canister, it naturally follows a helical pattern because the optical fiber continuously unwinds from the bobbin. In some instances, the helical component to the payout of the optical fiber can be undesirable. For example, if the optical fiber is to be dispensed through an opening in the canister wall of small diameter located a few centimeters from the bobbin, the helical motion can cause the optical fiber to rub against the entry of the tube, with possible damage to the optical fiber. Dispensing through a tube or duct is usually not possible if there is too large a helical component to the motion of the optical fiber as it enters the tube. In another example, the helical pattern can produce an increased radar signature, which is undesirable if the optical fiber is being dispensed from a missile in flight.

There is therefore a need for a technique to damp out the helical motion of the optical fiber as it is dispensed from the bobbin in a direction generally parallel to the axis of the bobbin. The approach must be compatible with other aspects of the storage and use of the optical fiber, such as long storage life in a variety of conditions. The present invention fulfills this need, and further provides related advantages.

SUMMARY OF THE INVENTION

The present invention provides an optical fiber canister and related structure which linearly dispense optical fiber from a bobbin in a manner such that the helical component of the motion of the optical fiber adjacent to the bobbin is damped. The optical fiber therefore dispenses linearly even near the bobbin and canister. As a result, the optical fiber can be dispensed through small openings, ducts, or tubes placed closely to the bobbin. The radar signature due to the helical pattern is reduced or eliminated. The damping approach of the invention is completely passive, requiring no control mechanism, and has no possibility of inoperability due to a component failure during storage or payout. This damping approach may be used in conjuction with other damping techniques, if needed.

In accordance with the invention, an optical fiber payout canister comprised a bobbin upon which an optical fiber is wound and container means for enclosing the bobbin. The container means includes a contact region that is positioned to be contacted by the optical fiber as it pays out from the bobbin. A layer of an ablative material is coated onto at least a portion of the contact region. As used herein, an "ablative material" is one that tends to be removed by erosion due to a frictional contact with another body. The ablative material has a hardness equal to or less than (i.e., no greater than) that of the buffer material of the optical fiber. The ablative material is preferably of the same composition as the buffer layer of the optical fiber, such as the urethane acrylate now widely used as a buffer material, or of a similar composition.

Most preferably, the bobbin is an outside payout bobbin having a rounded surface at the payout end to prevent damage to the optical fiber. The optical fiber is payed out through a dispensing opening in one end wall of the container means. The optical fiber is wrapped on the outside of the bobbin, and is forced to balloon outwardly by the forces imposed by the payout through the dispensing opening. The outwardly ballooned optical fiber contacts an inside wall of a shroud that overlies the bobbin and forms part of the container means.

If there were no ablative material coated onto the inside wall of the shroud, the soft polymeric buffer material on the optical fiber would be worn away due to the contact with the harder material of the shroud. Tests of outside payout, ballooning geometries without an ablative coating present reveal an accumulation of a dust within the shroud after the payout is complete. The dust was determined by analysis to be polymeric buffer material from the optical fiber, which has been worn away during payout. The optical fiber is thereby damaged to some extent, due to the undesired removal of a portion of the buffer layer.

With the present invention, the ablative material is coated over at least a contact region of the inside wall of the shroud, that is contacted by the ballooning optical fiber as it pays out from the bobbin. The contact of the moving optical fiber with the ablative material results in a wearing action that wears away the ablative material in preference to the buffer material of the optical fiber, or at no greater a rate than the buffer material of the optical fiber. The buffer material of the optical fiber and the optical fiber thereby sustain far less damage during the payout.

The contact of the optical fiber and the ablative material is not undesirable with the present approach. In fact, the frictional contact is beneficial in that it absorbs a portion of the helical or circumferential component of the energy of the optical fiber, reducing its velocity and causing it to collapse toward the center of the rotation. Since the dispensing opening or duct is placed at the center of rotation, the ablative material encourages the optical fiber to pass through the opening or duct for a linear payout (that is, in a straight line rather than a helical pattern).

The placement and function of the ablative material has been described in relation to the outside payout canister design. It is useful in other designs as well, to perform the same role.

The present invention therefore avoids damage to the optical fiber and also promotes a smooth linear payout of the optical fiber. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
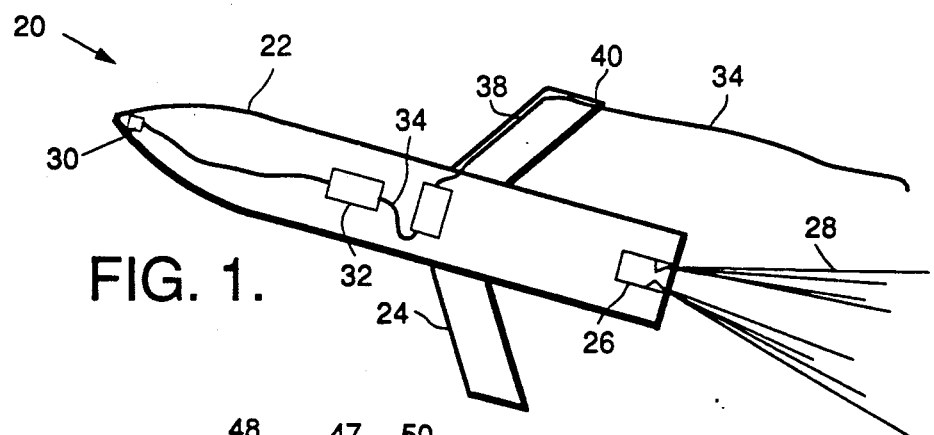
FIG. 1 is a schematic perspective view of a missile having an optical fiber guidance system, with portions of the skin of the missile removed to show interior components.

FIG. 1 illustrates a missile 20 in accordance with the invention. The missile has a body 22 and control surfaces 24 extending from the body. An engine 26 is positioned in the tail of the missile 20, with an exhaust plume 28 that extends rearwardly of the missile 20. A sensor 30 is located in the nose of the missile 20, and its output is conveyed to a guidance unit 32. An optical fiber 34 extends from the guidance unit 32 back to a control station (not shown) that typically (although not necessarily) is found at the launch site of the missile.

The optical fiber 34 is initially stored in a canister 36 within the body of the missile 20. The optical fiber 34 is payed out from the canister 36 as the missile flies through the air, at speeds up to 700 meters per second under present designs. In some designs of optical-fiber guided missiles, the optical fiber is dispensed through the tail of the missile. In that configuration, there are usually two engines positioned so that their plumes extend from the sides of the missile rather than the tail, an inherently less efficient design. The missile design of FIG. 1 is selected for illustration because it incorporates a duct 38 that conveys the optical fiber 34 from the canister 36, through the interior of the control surface 24, and to a release point 40. The optical fiber 34 is thereby conducted to a point laterally separated from the exhaust plume 28, so that it can be payed out without passing through the exhaust plume. Passage of the optical fiber through the hot gas of the exhaust plume might damage it.

When the optical fiber 34 is paying out at very high speeds of over 100 meters per second, it is difficult to convey it from the storage on the bobbin to the interior of the duct 38 without the optical fiber rubbing against interior surfaces of the duct. When the optical fiber is dispensed from a storage bobbin in a direction generally parallel to the axis of the bobbin and collapsed inwardly toward a dispensing opening or duct along the centerline of the canister, the optical fiber experiences a circumferential component of motion that causes it to displace radially outwardly due to centrifugal forces. This radial ballooning aids in achieving smooth liftoff of the optical fiber from the optical fiber pack and subsequent payout, but the circumferential component of energy and motion is detrimental to the collapsing of the helical pattern of motion inwardly so that the optical fiber can pass through the dispensing opening and duct.

Figure 2:
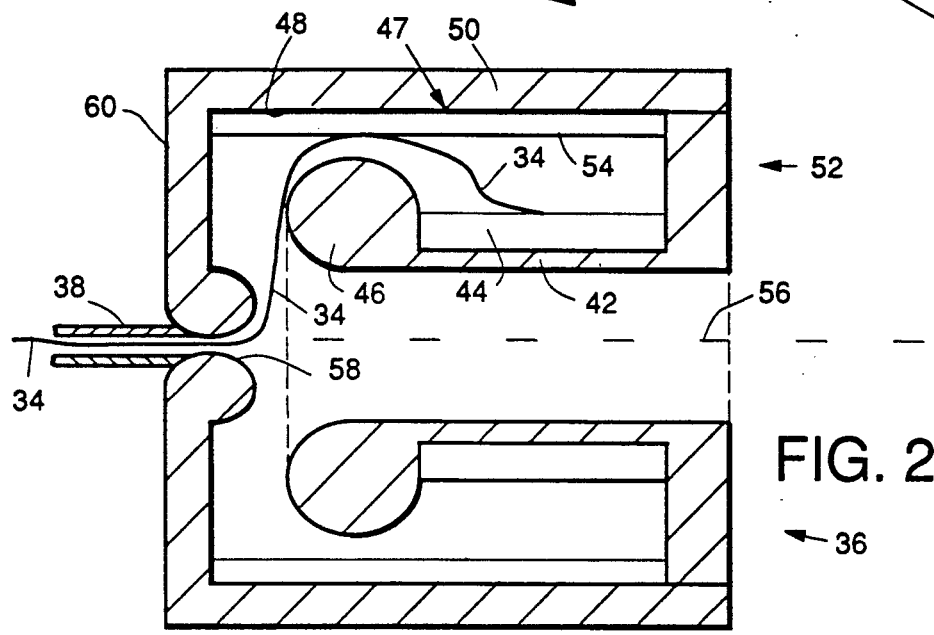
FIG. 2 is a sectional view of one embodiment of an optical fiber canister according to the invention.

FIG. 2 illustrates an embodiment of the invention wherein the optical fiber 34 is initially wound on a bobbin 42 in a side-by-side fashion to form layers, with tens of layers wound upon each other to form an optical fiber pack 44. A small amount of adhesive is typically applied to the optical fiber and the layers to hold them in place on the bobbin 42. In the embodiment of FIG. 2, a rounded surface 46 is formed at the payout end of the bobbin 42 to prevent the optical fiber 34 from encountering any sharp edges as it is payed out past the end of the bobbin 42. As the optical fiber 34 lifts radially outwardly from the optical fiber pack 44 during payout, it passes over the rounded surface 46 and away from the bobbin 42.

The centrifugal force on the optical fiber 34 as it rises radially outwardly from the bobbin 42 during payout causes it to contact a contact region 47 of an inner wall 48 of a shroud 50 that is part of a container 52 enclosing the bobbin 42. A layer 54 of an ablative material covers at least the contact region 47 portion of the inner wall 48, and may cover the entire inner wall 48 if conveniently applied to that entire inner wall 48. The ablative layer 54 is formed of a material that is removed by the frictional contact of the optical fiber 34 to the ablative layer 54. A preferred ablative material is the same material as the buffer layer of the optical fiber 34, or a similar material.

Most preferably, the ablative material is a urethane acrylate, inasmuch as the urethane acrylate is currently used as the buffer layer for the preferred optical fibers used for communication with missiles. The ablative material may be the same hardness and thence wear resistance as the buffer layer of the optical fiber, or may be of lesser hardness and wear resistance. (It may not be of greater hardness and wear resistance.) In either event, there will not be preferential removal of the buffer layer. The case where the ablative material is softer than the buffer layer material is preferred so that the ablative material is worn away rather than the buffer layer material. As is well known in the art, urethane acrylates and many other polymers, being curable polymeric compositions, can be hardened to different hardness levels by variations in formulation and processing. Thus, the ablative material can be the same chemical composition as the buffer layer, but hardened to a lower hardness level.

As the optical fiber 34 contacts the ablative layer 54, the resulting friction reduces the circumferential component (i.e., out of the plane of the illustration in FIG. 2) of energy and velocity of the optical fiber 34. The reduced circumferential velocity aids the optical fiber 34 in collapsing radially inwardly toward an axis 56 of the bobbin 42. Along the axis 56 there is a dispensing opening 58 in an end wall 60 of the container 52. The opening 58 is rounded in a toroidal fashion to avoid damage to the optical fiber 34 as it passes therethrough. In the illustrated canister 36 to FIG. 2, the opening 58 leads to the duct 38 discussed previously. Passage of the optical fiber 34 through the opening 58 and the duct 38 is an example of a "linear payout", wherein the optical fiber 34 follows an essentially straight line after it leaves the canister 36, as distinct from a helical payout that would occur if the circumferential component of the motion of the optical fiber 34 were not damped by the ablative material and other damping mechanisms that can be utilized in combination with the ablative damping.

Figure 3:
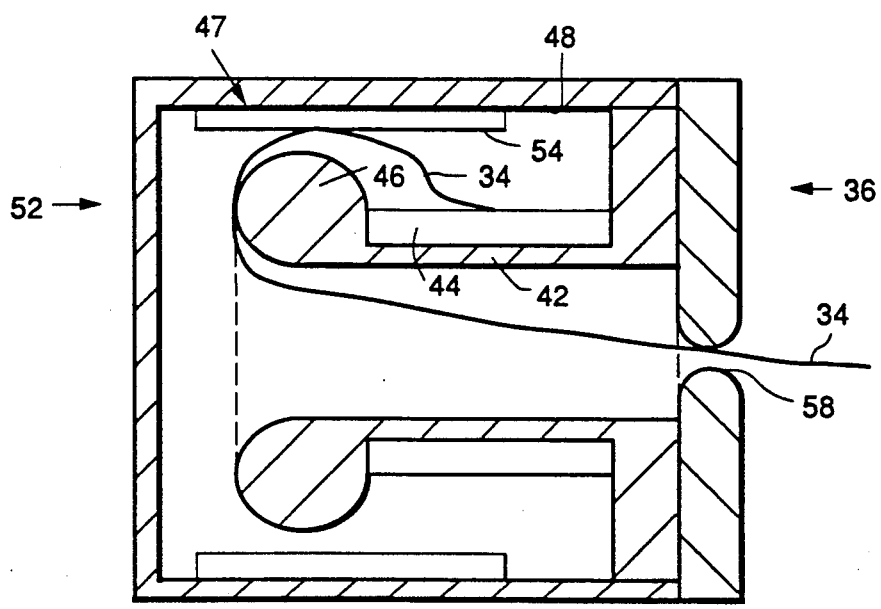
FIG. 3 is a sectional view of another embodiment of an optical fiber canister according to the invention.

The canister 36 of FIG. 2 is a "reverse cascade balloon dispense" type canister. The optical fiber 34 does not pass through the center of the bobbin 42. Another type of canister 36, a "cascade balloon dispense" canister, is illustrated in FIG. 3. Here the optical fiber 34 reverses direction during payout and passes through the center of the bobbin 42. The principles of the use of an ablative layer 54 are the same for the embodiment of FIG. 3 as for that of FIG. 2.

FIG. 3 has several other design variations to illustrate their use in conjunction with the invention. First, the embodiment of FIG. 2 has no duct through which the optical fiber passes after leaving the canister. Second, the ablative layer 54 covers only a portion of the inner wall 48. It is not necessary to cover the entire inner wall 48, only the contact region 47 where contact between the optical fiber and the inner wall 48 can occur.

The present invention may also be applied to damp circumferential motion in other applications of the optical fiber payout, such as inside payout canisters.

The present invention provides an advance in the art of optical fiber canisters by providing an additional mechanism and structure for damping out the circumferential motion and energy of the optical fiber during payout. The reduction of circumferential energy permits the optical fiber to more readily collapse toward the dispensing opening and/or duct at the centerline of the canister container. Where there is no opening or duct, and payout is from an open back end of the canister, the reduced circumferential energy is also beneficial because it encourages a linear payout rather than a helical payout, which has a higher radar signature than the linear payout. Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber payout canister, comprising:
   a bobbin upon which an optical fiber is wound;
   container means for enclosing the bobbin, the container means including a contact region that is positioned to be contacted by the optical fiber as it pays out from the bobbin; and
   a layer of an ablative material coated onto at least a portion of the contact region.

2. The payout canister of claim 1, wherein the optical fiber comprises a glass fiber coated with a polymer buffer layer, and the hardness of the ablative material is equal to or less than the hardness of the polymer buffer layer.

3. The payout canister of claim 1, wherein the ablative material is an urethane acrylate.

4. The payout canister of claim 1, wherein the bobbin is an outside payout bobbin in which the optical fiber is wound upon the outside of the bobbin.

5. The payout canister of claim 1, wherein the container means includes a shroud overlying the bobbin, and the ablative material is coated on the inside of the shroud adjacent to the bobbin.

6. The payout canister of claim 1, wherein the container means includes an end wall with a payout opening therein of a diameter less than that of the bobbin.

7. An optical fiber payout canister, comprising:
   a bobbin upon which an optical fiber is wound;
   a container formed of a shroud overlying the bobbin and an end wall with a dispensing opening therein through which the optical fiber is payed out; and
   a layer of an ablative material coated onto at least a portion of the inside of the shroud adjacent the bobbin, so that the optical fiber may contact the ablative material during payout.

8. The payout canister of claim 7, wherein the optical fiber comprises a glass fiber coated with a polymer buffer layer, and the hardness of the ablative material is not greater than that of the polymer buffer layer.

9. The payout canister of claim 7, wherein the ablative material is an urethane acrylate.

10. The payout canister of claim 7, wherein the bobbin is a tapered cylinder.

11. The payout canister of claim 7, wherein an end of the bobbin is rounded to prevent damage to the optical fiber as it is payed out.

12. A method for preparing an optical fiber canister, comprising:
    providing a bobbin upon which an optical fiber is wound;
    placing the bobbin in a structure arranged such that the optical fiber contacts a contact region of the structure during payout of the optical fiber from the bobbin; and
    coating the contact region of the structure with a layer of an ablative material.

13. The method of claim 12, wherein the optical fiber comprises a glass fiber coated with a polymer buffer layer, and the ablative material is the same material as the polymer buffer layer.

14. The method of claim 12, wherein the optical fiber comprises a glass fiber coated with a polymer buffer layer, and the ablative material has a hardness no greater than that of the polymer buffer layer.

15. The method of claim 12, wherein the ablative material is an urethane acrylate.

16. The method of claim 12, wherein the bobbin is an outside payout bobbin in which the optical fiber is wound upon the outside of the bobbin.

17. The method of claim 12, wherein the shroud has an end wall having a dispensing opening therein.

18. An optical fiber canister prepared by the method of claim 12.

* * * * *